US008266902B2

(12) United States Patent
Nolle et al.

(10) Patent No.: US 8,266,902 B2
(45) Date of Patent: Sep. 18, 2012

(54) VALVE MODULE

(75) Inventors: Gerhard Nolle, Plochingen (DE); Jurgen Arbter, Waiblingen (DE); Wolfgang Rammler, Stuttgart (DE); Michael Koch, Waiblingen (DE)

(73) Assignee: Festo AG & Co. KG, Esslingen (DE)

( * ) Notice: Subject to any disclaimer, the term of this patent is extended or adjusted under 35 U.S.C. 154(b) by 1083 days.

(21) Appl. No.: 12/176,683

(22) Filed: Jul. 21, 2008

(65) Prior Publication Data

US 2009/0045361 A1 Feb. 19, 2009

(30) Foreign Application Priority Data

Aug. 16, 2007 (DE) ........................ 10 2007 038 611

(51) Int. Cl.
*F16D 31/02* (2006.01)
*F15B 13/044* (2006.01)

(52) U.S. Cl. ............................... 60/406; 91/445; 91/459

(58) Field of Classification Search .................... 91/444, 91/445, 448, 459; 60/403, 406
See application file for complete search history.

(56) References Cited

U.S. PATENT DOCUMENTS

| | | | | |
|---|---|---|---|---|
| 5,454,291 | A * | 10/1995 | Ulm et al. | 91/445 |
| 5,458,048 | A * | 10/1995 | Hohner | 91/459 |
| 6,769,250 | B2 * | 8/2004 | Fuss et al. | 60/406 |

FOREIGN PATENT DOCUMENTS

| | | | |
|---|---|---|---|
| DE | 202005015791 | U1 | 12/2005 |
| DE | 102005052692 | B3 | 5/2007 |
| EP | 1586777 | B1 | 10/2005 |
| WO | WO2007042090 | A1 | 4/2007 |

* cited by examiner

*Primary Examiner* — Michael Leslie
(74) *Attorney, Agent, or Firm* — Hoffman & Baron, LLP

(57) ABSTRACT

A fluid power valve module has a supply port for fluid and at least one fluid power and more especially pneumatic valve able to be controlled via the control interface of the valve module for control of a fluid power instrumentality by way of power ports on the basis of the supplied fluid. There is a provision such that the valve module comprises at least one switching output integrated in its housing for output of a switching signal for switching a switching means for influencing and more especially deactivating the instrumentality.

26 Claims, 3 Drawing Sheets

VALVE MODULE

CROSS-REFERENCE TO RELATED APPLICATION

This application claims priority based on German Application No. 10 2007 038 611.9 filed on Aug. 16, 2007, which is incorporated herein by reference.

BACKGROUND OF THE INVENTION

Field of the Invention

The invention relates to a fluid power and more particularly pneumatic valve module comprising a supply port for the supply of fluid and at least one fluid power and more particularly pneumatic valve able to be controlled by way of a control interface of the valve module for control of a fluid power instrumentality by way of power ports on the basis of the supplied fluid.

BRIEF DESCRIPTION OF THE RELATED ART

The instrumentality may for example be a pneumatic cylinder, which is controlled pneumatically by the valve module. The valve module is for example a servo valve and in particular a proportional valve, which serves for the control of a pneumatic drive. The pneumatic drive is for example a pneumatic power cylinder, which is controlled by the valve module. The valve module for example receives control signals from a master control for switching its valve. The European patent publication EP 1 586 777 A1 for example discloses such a valve module. This valve module furthermore possesses sensors on board, as for example pressure sensors.

SUMMARY OF THE INVENTION

If further switching means are required, as for example a clamping means or a brake for clamping or a brake of a power tapping means of the instrumentality, valves for the interruption of fluid connection for example in the case of failure or the like it is necessary for additional ducts to be placed between the such means and the master control. Furthermore it is necessary for the master control means to produce separate switching instructions for switching the safety valves or the clamping means.

One object of the present invention is therefore to provide for a simple linking of a switching means for further influencing an instrumentality controlled by a valve module of the type initially mentioned.

For attaining this object in the case of a valve module of the type initially mentioned there is a provision such that the valve module possesses at least one switching output integrated in a housing thereof for the output of a switching signal for switching a switching means for influencing and more particularly for deactivating the instrumentality.

Using the integrated switching output the valve module in accordance with the invention may preferably directly control a connected device, for example a switching valve between a shut off and an open state.

In accordance with the concept of the invention a switching signal, preferably a security switching signal, is produced directly by the valve module and is made available at the one or more switching outputs. The valve module can however receive the switching signal for example also at the control interface from the master control. By way of the control interface the valve module otherwise receives conventional signals, as for example valve setting signals for changing the setting of a valve member of the valve on board the valve module.

The at least one switching output is for example a wired optical or electrical switching output. The at least one switching output can also be a component of a wireless interface, for example an optical interface or a radio interface.

The valve module preferably produces the switching output itself, for example in a manner dependent on at least one sensor signal and/or a control signal generated by a control means. The control means may for example be a local control means comprised in the valve module or a master external control means. The sensor signal can be generated by an external sensor, which is connected with the valve module, as for example a position sensor on the instrumentality.

A preferred design of the invention is however such that a sensor arrangement is provided on board the valve module for producing a sensor signal. The sensor arrangement produces the sensor signal in a manner dependent on, for example, a operational state of the valve module or of the connected instrumentality. The sensor arrangement may preferably comprise one or more pressure sensors responsive to a pressure obtaining at the power port or at the supply port. Moreover, measurement of the flow rate for the power port and/or the supply port may be implemented using a suitable flow rate sensor. The sensor arrangement may however include a position sensor responsive to a position of a valve member of the valve on board the valve module, a temperature sensor, a voltage sensor or an amperage sensor. It will be apparent that dependent on requirements further sensor means may be present in the valve module.

The at least one switching output is preferably parameterizeable. Thus limit values of the sensor values, switched on and off times, brake values, tolerances, f.i. voltage tolerances, or the like are able to be set as parameters. Parameterizing may take place via the control interface or via a separate parameterizing connection specifically provided for parameterizing.

The switching means may for example comprise a valve arrangement connected between the valve module and the instrumentality. The valve arrangement preferably constitutes a so-called fail-safe circuit. Fluid flow from and/or to the instrumentality may be influenced, and for example interrupted. Thus the instrumentality may for example be switched off. The switching means may however also be a brake and/or clamping means acting on the actuator member of the instrumentality, which acts directly or indirectly on the actuator member. The switching means may for example cooperate indirectly with the actuator member via a force tapping or output point joined with the actuator member. The clamping means may in the case of a failure halt the actuate member just where it is.

A local control means for control of the valve of the valve module is preferably provided on board the valve module. Furthermore, a regulation means, which may also constitute a component of the control means, is advantageous for regulation of the valve. Thus for example a position or force regulation means is advantageous. Then the input signal available at the control interface is for example a valve setting signal.

The regulation means may however also be adapted for the control of the valve as a proportional valve, a pressure regulating valve and in particular a differential pressure valve. The regulation of pressure takes place in a highly dynamic manner. In this form of operation the valve module will for example receive pressure target values via the control interface. It will be clear that the regulation means may be preferably able to be switched over the different regulation modes, for example via the above mentioned parameterizing interface or the control interface.

The control means or the regulation means are preferably designed for the control of the at least one switching output. Thus the control means may for example cause output of a control signal at the switching output in the case of a failure, which the switching means has for deactivation of the instrumentality. For example the above mentioned fail-safe valve arrangement may be controlled to turn off the fluid connections between the valve module and the instrumentality.

The valve on board the valve module is preferably a switching valve and/or a continuous valve and/or a regulating valve. It is particularly preferred to have a 5/3 directional valve on board the valve module. A 5/3 directional valve fulfills the function of otherwise necessary 3/3 pressure regulation valves. Preferably the middle position of the directional valve is the off position.

The control interface and the at least one switching output are preferably joined together so that the switching output is board can be operated by way of the control interface. Thus for example a master control at the control interface may transmit a switching signal for deactivating or activating the instrumentality. This signal is passed on farther directly by the control interface to the at least one switching output. Accordingly there is a simplification of the control of the instrumentality. The arrangement of the wiring is readily produced and more particularly no separate wiring must be laid between the master control means and the switching means.

The control interface is best in the form of a bus interface, and for example a field bus interface.

The valve module preferably has a concatenation interface for concatenation with further valve modules or further device more particularly connected by way of a bus with the valve module. For instance the control interface may be looped through to the bus interface.

It is an advantage for the valve module to have a transmission means for the transmission of diagnostic data and/or device data of the valve module, of a device connected with the valve module, for example the instrumentality or of the switching means. Accordingly the transmission means may for example report a switching condition of the switching means.

The switching output may conveniently possess a digital and/or analog switching output. It is an advantage for the switching state at the switching output to be further reported by way of the control interface, for example to a master control.

Furthermore the valve module in accordance with the invention is not only designed for the output of switching signals but also for the detection of input signal, for which purpose at least one report input is provided integrated in the housing of the valve modules. The report input may be adapted for the detection of digital and/or analog data. By way of the report input it is possible for example for position sensors or other sensors, which are more particularly arranged on the instrumentality, to report signals to the valve module. The report input and the switching output are preferably coupled with one another, for example directly via a wired connection or indirectly, for example via the control means or the regulation means of the valve module. The switching output produces the switching signal in a manner dependent on at least one input signal, which is present at the report input.

The valve module is preferably a separately operable sort of stand alone valve module. However in accordance with an alternative design may be such that the valve module is in the form of a module for a valve cluster, which includes several valve modules, input/output modules or the like placed in a row.

BRIEF DESCRIPTION OF THE DRAWINGS

In the following working examples of the invention will be explained with reference to the drawings.

DETAILED DESCRIPTION OF THE EMBODIMENTS

Figure 1:
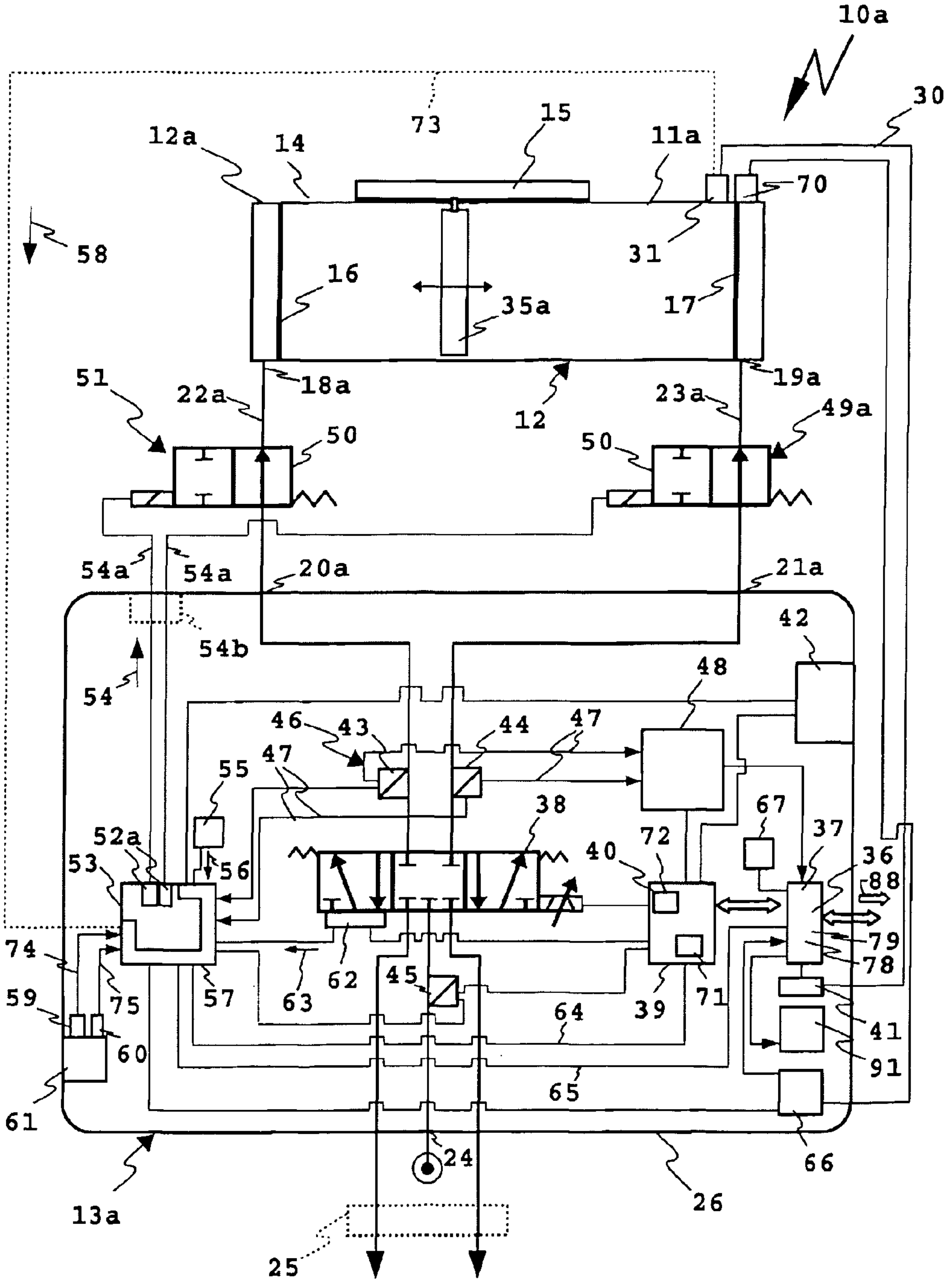
FIG. 1 is a diagrammatic view of a fluid power arrangement with a pneumatic linear drive and a pneumatic valve module for the control thereof.
Figure 2:
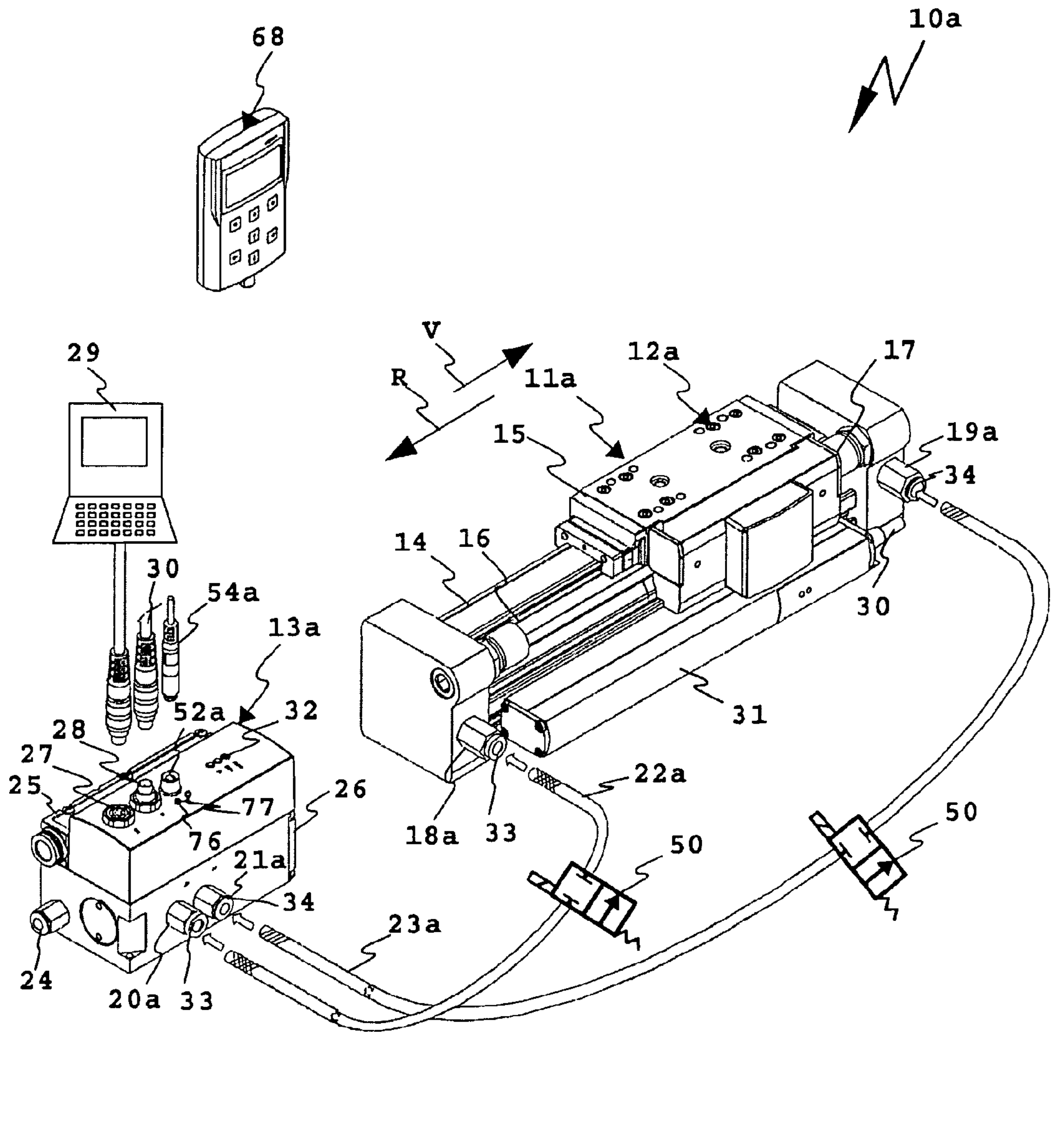
FIG. 2 shows a perspective view of the arrangement in accordance with FIG. 1.

For the following description of working examples identical or similar components are denoted by the same reference numerals or by reference numerals with indices a and b.

A fluid power arrangement 10*a* comprises a pneumatic drive 11*a* as a fluid power instrumentality 12*a*. The drive 11*a* is a linear drive. The drive 11*a* is supplied with a fluid, in the present case compressed air, by way of a valve module 13*a* so that an actuator member 35*a* disposed in the interior of the drive 11*a* shifts a carriage 15 guide externally on the housing 14 of the drive 11*a* to and fro between terminal abutments 16 and 17.

For forward travel V of the carriage 15 toward the terminal abutment 17 the valve module 13*a* supplies the drive 11*a* at a device fluid port 18*a* with fluid, while compressed air may leave from a device fluid port 19*a* (at the output end) arranged at the terminal abutment 17. In the reverse direction. i.e. in the case of reverse travel R the valve module 13*a* supplies the device fluid port 19*a* with compressed air, whereas compressed air may then emerge via the device fluid port 18*a* at the exit flow end.

The device fluid ports 18*a* and 19*a* are able to be connected with valve module power ports 20*a* and 21*a* of the valve module 13*a* by way of fluid lines 22*a* and 23*a* and are connected for operation of the arrangement 10*a*. The fluid lines 22*a* and 23*a* are flexible pipes able to be plugged into the fluid ports 18*a* through 21*a* and preferably automatically locked in position by them.

The valve module 13*a* is able to be supplied with compressed air via a supply port 24. Compressed air returning from the instrumentality 12*a* to the valve module 13*a* may be vented via a spent air means 25 as for example a muffler. The spent air means 25 preferably constitutes a component of the valve module 13*a* and is arranged on the housing 26 thereof.

On the housing 26 there are furthermore ports 27 and 28 for linking the valve module 13*a* with further means, as for example control and sensor means.

For example the port 27 is a component of a control interface 36. The control interface 36 includes a bus interface 37 for connection of a control means 29 controlling or regulating the valve module 13*a*.

Figure 3:
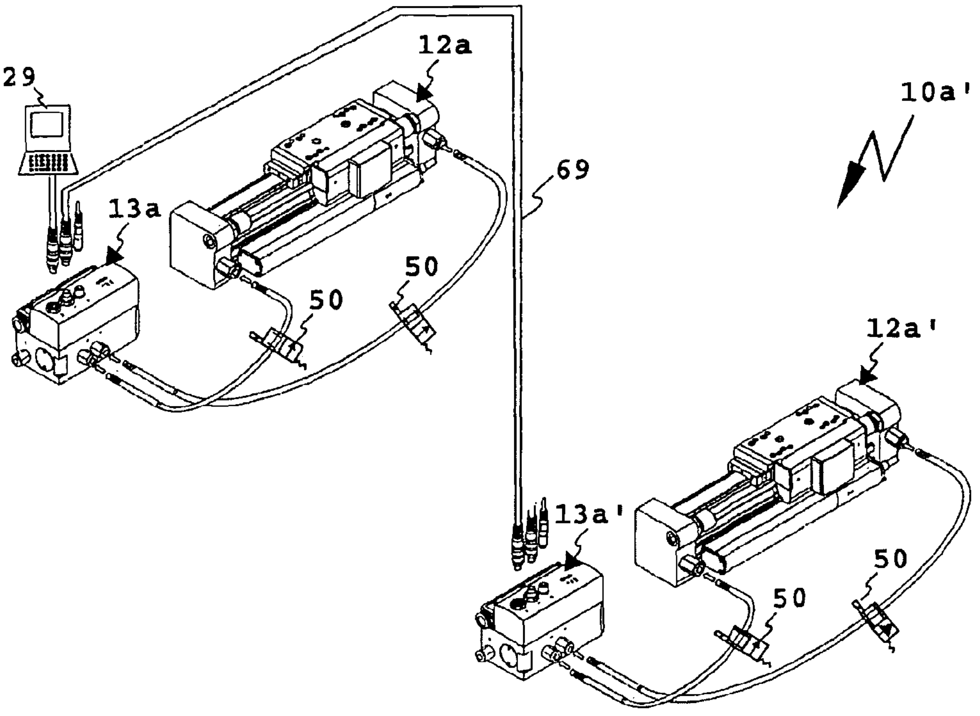
FIG. 3 shows two mutually concatenated valve modules for the control of an instrumentality.

The port 28 is a component of a concatenation interface 41 for concatenation of the valve module 13*a* with further valve modules, for example a valve module 13*a*' (see FIG. 3). The concatenation interface 41 is for example a bus interface, as for instance a field bus interface. Leads of the control interface 36 are for example looped through to the concatenation interface 41.

A connection line 30 leading to a position sensor means 31 for finding the respective position of the carriage 15 can however also be connected with the concatenation interface 41, if the position finding means 31 for example has a bus interface.

Display means 32 of the valve module 13*a* serve for the display of operational states, as for example failure condition, correct power supply voltage or the like.

Owing to the configuration of the ports 27 and 28 as bushings and plug an electrically correct wiring of the arrangement 10 is readily ensured.

From the point of view of fluid power and pneumatic features an operationally reliable and correct arrangement of the flexible piping or fluid connection between the devices 11*a* and 13*a* may be produced by expedient and optional measures. For instance, the device fluid ports 18*a* and the valve module power ports 20*a* have identical release rings 33 as a first mechanical codification. The release rings 34 of the fluid ports 19*a* and 21 differ mechanically from the release rings 33 and therefore constitutes a second mechanical codification. For instance the release rings 33 project farther past the fluid connection bodies of the fluid ports 18*a* and 20*a* than the release rings 34 in the case of the fluid ports 19*a* and 21*a*. Furthermore the fluid lines 22*a* and 23*a* and preferably also the fluid ports 18*a*, 20*a* and, respectively, 19*a* and 21*a* have for example different color codifications or corrugations so that a clear association of colors as regards the fluid lines and fluid ports is provided.

The valve module 13*a* comprises a valve 38 which is able to be controlled via the control interface 36. By way of the control interface 36 the valve module 13*a* receives position signals for a valve member, not illustrated, of the valve 38. These position signals are however not transmitted directly from the control interface 36 to the valve 38, but transmitted to a control means 39 of the valve module 13*a*.

The control means 39 furthermore includes a regulating module 40 which constitutes a regulating valve 72. A processor 71 implements program code of the regulating module 40. The regulating module 40 regulates, on the basis of valve setting signals received by way of the control interface 36, a respective position of the valve 38. The valve 38 is a 5/3 directional valve. The regulating module 40 is able to be switched over between position regulation and pressure regulation and furthermore proportional regulation, for example on the basis of suitable control parameters, which the valve module 13*a* receives at the control interface 36 or a parameterizing interface 42.

For pressure regulation the control means 39 for example evaluates sensor signals 47 received from pressure sensors 43, 44 and 45 of a sensor arrangement 46. The pressure sensors 43 and 44 are assigned to power ports 20*a* and 21*a*. The pressure sensor 45 is responsive to the supply pressure at the supply port 24. As an optional feature the sensors 43, 44 and 45 may have a pressure detection means 48 assigned to them, which prepares the sensor signals 47, for example for the control means 39, for example as regards signal level or smoothes the signals or performs some similar operation.

The valve module 13*a* however controls not only the instrumentality 12*a* pneumatically but also switches switching means 49*a* for deactivating the instrumentality 12*a*. The switching means 49*a* comprise switching valves 50 of a valve arrangement 51. The switching valves 50 are placed on the fluid lines 22*a* and 23*a* and can turn the compressed air flow through the fluid lines on or off. The valve module 13*a* switches the switching valves 50 by way of switching outputs 52*a* or a switching output means 53. The switching outputs 52*a* are integrated in the housing 26 of the valve module 13*a*. The valve module 13*a* has the switching outputs 52*a* on board. Via lines 54*a* or also selectively via a wireless interface 54*b* the valve module 13*a* transmits switching signals 54 for switching the switching valves 50 into their turned off of turned on position. For instance in the case of failure the valve module 13*a* will switch the two switching valves 50 into their turned off state so that the instrumentality 12*a* is locked. Accordingly the valve arrangement 51 constitutes a fail safe arrangement.

The valve module 13*a* reports a respective position of the switching valves 50 by way of the control interface 36, which to this extent functions as a transmission means 79 for the transmission of at least one switching state of the switching means 49*a*.

The valve module 13*a* produces the switching signal 54 in a manner dependent on, for example, the pressure sensor signals 47. In the case of there being an unexpected drop in pressure at one of the power ports 20*a* and 21*a*, of a pressure loss at the supply port 24 or the like, the valve module 13*a* will produce the switching signal 54 for switching the switching valves 50 into their turned off position so that the instrumentality 12*a* is turned off.

Moreover, the valve module 13*a* possesses a temperature monitoring means. A temperature sensor 55 monitors the temperature of the valve module 13*a*, as for example of the valve 38 or of a current supply 61 of the valve module 13*a*. The temperature sensor 55 produces a temperature sensor signal 56, which is received by the switching output means 53 at an input interface 57. On a temperature limit value, able to be set for example at the parameterizing interface 42, being exceeded the switching output means 53 switches the switching valves 50 into the turned off position.

The position sensor 31 may also for example be connected with the input interface 57, something which is indicated by a dotted connection line 73. The position sensor 31 produces a position sensor signal 58. In a fashion dependent on the sensor signal 58 the switching output means 53 switches the switching valves 50. When for example a limit position has been exceeded, the actuator member 35*a* for example comes too near the terminal abutments 16 and 17, a predetermined speed is exceeded or the like, the switching output means 53 will switch the switching valves 50 into their turned off position.

Furthermore it would be possible for example for a voltage sensor 59 and an amperage sensor 60 to monitor the power supply 61 of the valve module 13*a* and for the switching output means 53 to produce the switching signal 54 on the basis of the sensor signals 74 and 75 supplied by the sensors 60 and 61, for example in the case of a drop in amperage or voltage, the switching valves 50 being turned off in the case of a voltage or amperage drop.

A position sensor 62 of the valve module 13*a* finds the respective position of a valve member of the valve 38 and produces a position sensor signal 63 dependent on such position. The regulating module 40 regulates the position of the valve member on the basis of the position sensor signals 63.

The position sensor 62 also forwards the position sensor signal 63 to the switching output means 53. When the valve member for example jams or is retarded in its motion by an obstacle, this may be seen on the basis of the position sensor signal 63. The switching output means 53 evaluates the position sensor signal 63 and thus may for example recognize a trouble condition of the valve 38. In the case of a trouble condition the switching output means 53 will switch the switching valves 50 into the turned off state via at least one switching output 52*a*. The switching output 52*a* is a digital switching output. The switching valves 50 could be connected in parallel with a single switching output 52*a*.

The switching output 52*a* may also be controlled by the switching output means 53 and/or the regulating module 40. If for example the regulating module 40 detects in the regulation of the valve 38 a trouble condition, a fall in pressure at one of the fluid ports 20*a*, 21*a* or 24 or the like, the regulating module 40 may control via a line 64 the switching output means 53 for switching the switching means 49*a*, for example for switching the switching valves 50 into the turned off or on setting. Furthermore it is possible for the switching output means 53 to be controlled as well via the control interface 36, which is preferably a bus interface.

For this purpose a line 65 is provided. In the case of both above mentioned designs the switching outputs 52*a* could conceivably be controlled directly from the control means 39 or by the control interface 36, i.e. so that no switching output means 53 must be present.

The switching output means 53 may however also be governed via a report input 66, as for example a digital or an analog report input. For example a position sensor 70 may for example be connected with the report input 66 and signalize an end position of the actuator member 35*a*. When the actuator member 35*a* for example strikes the end abutment 17, this will be reported by the position sensor 70, which is for example an inductive sensor, to the report input 66. The valve module 13*a* then for example switches the switching valves 50 into the turned off position.

Furthermore the report input 66, which can be a digital or analog report input, is connected with the control interface 36 so that an input signal detected by the report input 66 can be passed on directly via the control interface 36, for example to the master control means 29.

A preferably digital switching output 91 is able to be controlled directly via the control interface 36 for switching a switching means, as for example the switching means 49. Thus for example the master switching means 29 may directly activate the switching output 91 via the control interface 36 and for example produce a signal for switching the switching valves 50 (not illustrated).

Display means 76, as for example acoustic and/or optical display means, for example an LED array 77, serve to indicate the respective switching state of the switching outputs 52*a*.

Furthermore there are extensive diagnostic and parameterizing possibilities in the case of the valve module 13*a*. Thus for example characteristics of the valve 38 are held in a device data memory 67 as for example the rated flow and the valve type, a serial number of the valve module 13*a* or the like. It is furthermore even possible for characteristics of the connected instrumentality 12*a* to be stored in the device memory 67, as for example the piston diameter or the like. The valve module 13*a* communicates such device data by way of the control interface 36, which therefore constitutes a transmission means 78 for the transmission of diagnostic data and/or device data.

The valve module 13*a* communicates additional diagnostic information, as for example with respect to jamming in the connected instrumentality 12*a* and/or in the valve 38, an excessively high temperature, an excessively high current or the like by way of the control interface 36 or a diagnostic connection, not illustrated.

The valve module 13*a* is able to be parameterized via the parameterizing interface 42. For example a parameterizing device 68 may be connected to the parameterizing interface 42 in order to parameterize limit values, connection times, turned off times or the like for the valve module 13*a*.

The valve module 1*a* is able to be concatenated with further modules and in particular further valve modules. A fluid power arrangement 10*a*' as end depicted in FIG. 3 shows just such a concatenated system for example. Instrumentalities 12*a* and 12*a*' are for example components of a multi axis system, which is able to be controlled from the control means 29 in an integrated manner. The valve module 13*a* is connected via a concatenating line 69 with a further valve module 13*a*' which governs an instrumentality 12*a*', as for example a fluid power linear drive as well. The concatenating line 69 is for example plugged into the port 28. The concatenating line 69 is for example a bus line.

Figure 4:
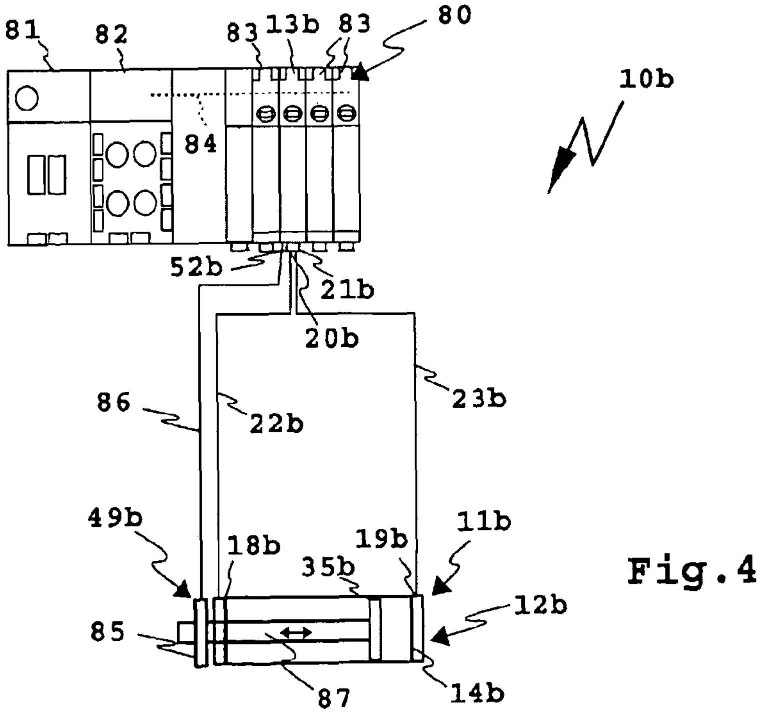
FIG. 4 is a diagrammatic view of a valve module as a component of a valve cluster in control of a pneumatic power cylinder.

The concept of the invention is also applicable to cluster-like valve modules. It may for example comprise a valve cluster 80 illustrated in FIG. 4, a governing module 81 for the control of further components, namely an input/output module 82 and valve modules 83 and a valve module 13*b*' in accordance with the invention. The governing module 81 controls the modules 82, 83 and 13*a* via an internal bus 84, via which the above mentioned modules communicate with each other. For example the valve module 83 has a control interface (not illustrated) system for the bus 84.

The valve module 13*b* of the fluid power arrangement 10*b* controls by way of its power ports 20*a* and 20*b* an instrumentality 12*b* such as a pneumatic drive 11*b*. Fluid lines 22*b* and 23*b* lead from device fluid ports 18*b* and 19*b* of the instrumentality 12*b* to the valve module 13*b*. By fluid actuation of its power ports 20*b* and 21*b* the valve module 13*b* operates an actuating member 35*b*, as for example a piston, of the drive 11*b* designed in the form of a pneumatic cylinder. A piston rod 87 is disposed on the piston rod or, respectively, actuator member 35*b* and serves to tap power and projects in front of a housing 14*b* of the drive 11*b*.

The piston rod 87 may be clamped by means of a clamping means 85 so that it dwells in its position. This is an advantage more particularly in a failure situation or when the drive 11*b* is to be deactivated.

The input/output module 82 might conceivably be employed to control the conduction means 85. In the case of the valve module 13*b* however a simpler design has been selected. A line 86 runs from one switching output 52*b* of the valve module 13*b* to the clamping means 85, which constitutes a switching means 49*b*. In response to an instruction received via the inlet bus 84 the valve module 13*b* may for example switch the clamping 85 into the clamping position or the released position. Furthermore internal sensor signals from the valve module 13*b* may cause this switching action, as for example the sudden occurrence of excess pressure at the supply port (not illustrated) or the like.

What is claimed is:

1. A fluid power valve module comprising:

a supply port for fluid; and at least one pneumatic fluid power valve able to be controlled by a control interface of the valve module to control a fluid power instrumentality using power ports on the basis of the supplied fluid, wherein the valve module includes at least one switching output integrated in a housing of the fluid power valve module that outputs a switching signal that controls a switching means to deactivate the fluid power instrumentality.

2. The valve module as set forth in claim 1, wherein the valve module produces the switching signal in a fashion dependent on at least one sensor signal or a control signal produced by a control means.

3. The valve module as set forth in claim 1, wherein the valve module includes a sensor arrangement to produce a sensor signal in a manner dependent on at least one operational state of the valve module or of the fluid power instrumentality.

4. The valve module as set forth in claim 3, wherein the sensor arrangement comprises at least one pressure sensor responsive to pressure present at a power port or at the supply port, and/or a position sensor responsive to a position of a valve member of the valve, and/or a temperature sensor, and/or a voltage sensor and/or at least one amperage sensor.

5. The valve module as set forth in claim 1, wherein the at least one switching output is able to be parameterized.

6. The valve module as set forth in claim 1, wherein the switching means comprises a valve arrangement placed between the valve module and the fluid power instrumentality.

7. The valve module as set forth in claim 1, wherein the switching means comprises a braking and/or clamping means effective on an actuator member of the fluid power instrumentality.

8. The valve module as set forth in claim 1, further comprising a control means to control the valve and/or a regulation means to regulate the valve.

9. The valve module as set forth in claim 8, wherein the regulation means is adapted for control of the valve as a proportional valve and/or a pressure regulating valve and/or a differential pressure regulating valve.

10. The valve module as set forth in claim 8, wherein the control means or the regulation means is adapted to control the at least one switching output.

11. The valve module as set forth in claim 1, further comprising a switching valve and/or, continuous valve and/or, regulating valve, and/or 5/3 directional valve.

12. The valve module as set forth in claim 1, wherein the control interface and the at least one switching output are connected, the at least one switching output being able to be operated directly via the control interface.

13. The valve module as set forth in claim 1, wherein the control interface comprises a field bus interface.

14. The valve module as set forth in claim 1, further comprising a concatenation interface for concatenation with further valve modules.

15. The valve module as set forth in claim 1, further comprising a transmission means for transmission of diagnostic data and/or device data relative to the valve module and/or relative to the device connected with the valve module.

16. The valve module as set forth in claim 1, further comprising a transmission means for the transmission of at least one switching state of the switching means.

17. The valve module as set forth in claim 16, wherein the valve module is adapted for output, via the control interface, of at least one switching output state signal indicating a respective state of at least one switching output.

18. The valve module as set forth in claim 1, wherein the at least one switching output comprises a digital and/or analog switching output.

19. The valve module as set forth in claim 1, further comprising at least one report input integrated in a housing of the valve module for the reception of at least one input signal.

20. The valve module as set forth in claim 19, wherein the at least one report input is connected with the control interface, the input signal being transmitted by the at least one report input to the control interface.

21. The valve module as set forth in claim 19, wherein the at least one report input and the at least one switching output are coupled and the at least one switching output produces the switching signal in a fashion dependent on at least one input signal of the at least one report input.

22. The valve module as set forth in claim 1, wherein the at least one switching output comprises a wired output and/or a wireless interface.

23. The valve module as set forth in claim 1, wherein the valve module housing is designed for incorporation in a valve cluster that has several valve modules arranged in a row.

24. A fluid power arrangement comprising at least one valve module as set forth in claim 1 with a switching means connected with the valve module.

25. A fluid power valve module comprising:

a supply port for fluid;

at least one pneumatic fluid power valve able to be controlled by a control interface of the valve module to control a fluid power instrumentality using power ports on the basis of the supplied fluid, wherein the valve module includes at least one switching output integrated in a housing of the fluid power valve module to output a switching signal that controls a switching means to deactivate the fluid power instrumentality; and a sensor arrangement to produce a sensor signal in a manner dependent on at least one operational state of the valve module or of the fluid power instrumentality, the sensor arrangement comprising at least one of a voltage sensor and an amperage sensor to monitor a power supply associated with the valve module, the switching output outputting the switching signal based on a change in at least one of voltage and amperage sensed by at least one of the voltage sensor and amperage sensor.

26. A fluid power valve module comprising:

a supply port for fluid; and at least one pneumatic fluid power valve able to be controlled by a control interface of the valve module to control a fluid power instrumentality using power ports on the basis of the supplied fluid, wherein the valve module includes at least one switching output integrated in a housing of the fluid power valve module to output a switching signal that controls a switching means to deactivate the fluid power instrumentality, the control interface and the at least one switching output being connected, the at least one switching output being able to be operated directly via the control interface, the switching output being controlled by a report input, the report input being connected to the control interface such that input signals at the report input are transferred by the control interface to a master controller.

* * * * *